April 6, 1954  A. E. LANGENBAHN  2,674,003
POULTRY DECAPITATOR
Filed Dec. 10, 1951  2 Sheets-Sheet 1
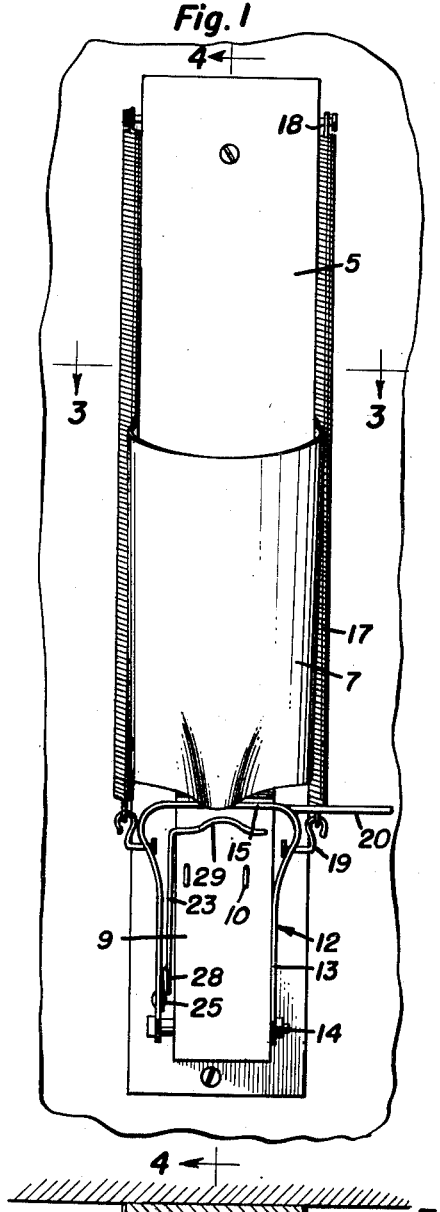
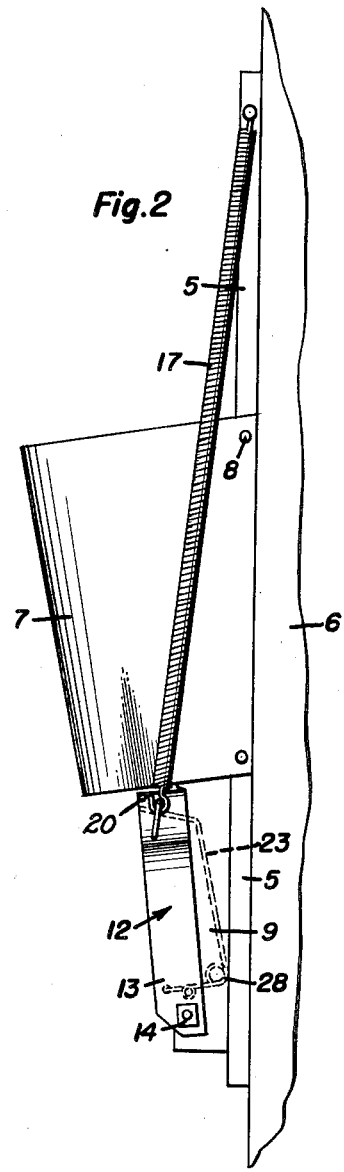
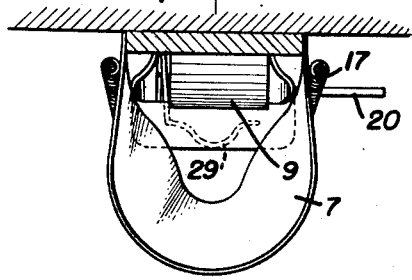
Albert E. Langenbahn
INVENTOR.
BY
*Attorneys*

April 6, 1954 — A. E. LANGENBAHN — 2,674,003
POULTRY DECAPITATOR
Filed Dec. 10, 1951 — 2 Sheets-Sheet 2

Albert E. Langenbahn
INVENTOR.

Patented Apr. 6, 1954

2,674,003

UNITED STATES PATENT OFFICE 2,674,003

POULTRY DECAPITATOR

Albert E. Langenbahn, New Holland, Ill.

Application December 10, 1951, Serial No. 260,887

6 Claims. (Cl. 17—12)

1

The present invention relates to new and useful improvements in poultry decapitators and embodying means for holding a chicken or other fowl, together with a spring actuated pivoted knife for severing the head from the chicken.

An important object of the invention is to provide a device of this character by means of which a chicken or other fowl may be held with its head downward while severing the head from the chicken to effectively bleed the decapitated fowl.

Another object is to provide independent means for clamping the head of the chicken against a chopping block and connecting the head holding means to the cutter for actuating the former by the latter in a manner to scrape the neck feathers out of the path of the cutter to prevent interference of the feathers with the effective severing of the head by the cutter.

A further object is to provide a device of this character of simple and practical construction, which is efficient and reliable in operation, relatively inexpensive to manufacture and otherwise well adapted for the purposes for which it is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view;

Figure 2 is a side elevational view;

Figure 3 is a top plan view;

Figure 5:
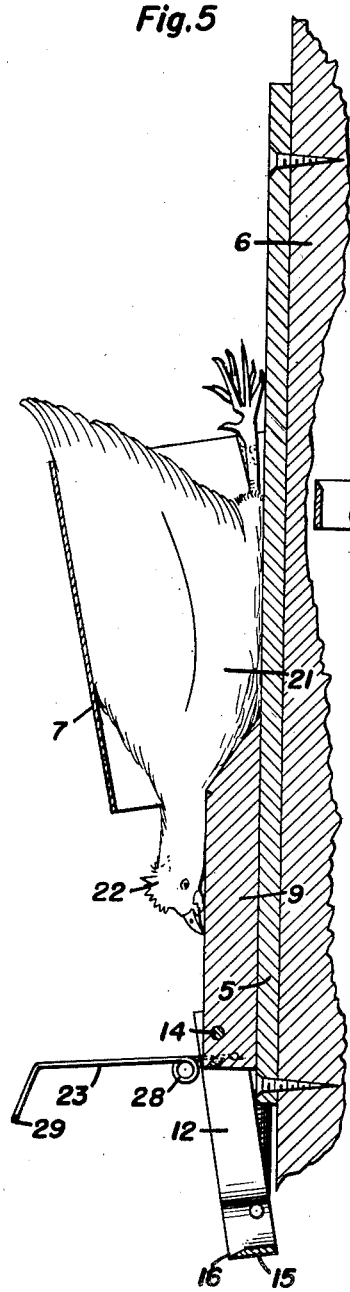
Figure 5 is a similar view showing a chicken held in the device in decapitating position.

Referring now to the drawings in detail wherein for the purpose of illustration I have disclosed a preferred embodiment of the invention, the numeral 5 designates an elongated attaching base which may be constructed of suitable material and which is secured in a vertical position to the side of a post 6 or other suitable supporting structure.

A substantially funnel-shaped holder 7 is se-

2 cured in a vertical position to the sides of the base 5 by screws or other suitable fasteners 8 and with the narrow end of the holder facing downwardly. A cutting block 9 is secured to the outer surface of the base 5 immediately below the lower end of the holder 7 and to which a hook 10 is secured for attaching a receptacle 11 beneath the holder.

A substantially U-shaped cutter 12 is pivotally attached at the ends of its leg portions 13 at the lower side portions of the cutting block 9 by means of a bolt and nut or other pivot device 14 for vertical swinging movement of the cutter and with the bight portion 15 of the cutter sharpened to form a knife edge 16.

A pair of coil springs 17 are positioned at the sides of the base 5 with their upper ends attached to the upper portion of the base by screws or the like 18 and with the lower ends of the springs attached to the sides of the cutter 12 adjacent the bight portion 15 thereof by means of hooks or the like 19. A handle 20 projects outwardly at one side of the cutter at its bight portion.

The holder 7 is adapted to receive a fowl or chicken 21 in its upper end with the head 22 of the chicken positioned downwardly and protruding below the lower end of the holder.

A spring wire head clamping device 23 is coiled adjacent one end as at 24, around a pin 25 on the inside of one of the leg portions 13 adjacent the pivoted end of the cutter 12 and the adjacent end of the wire is bent angularly, as at 26, and anchored in an opening 27 in the cutter. The head clamping device is also formed with a spring wire coil 28 adjacent its attached end and the free end of the clamping device is shaped with a lateral curved clamping bar 29 inwardly of the bight portion 15 of the cutter.

The spring coil 28 normally holds the head clamping device 23 at right angles to the cutter 12 and in a forwardly projecting position when the cutter is cocked, as shown in Figure 5, and in advance of the cutter in its cutting movement. The cutter is held in cocked or lowered position below the chopping block 9 by the tension of springs 17 which swing the cutter rearwardly past the center of its pivot 14. A chicken is then placed in holder 7 with its head below the narrow lower end of the holder.

Figure 6:
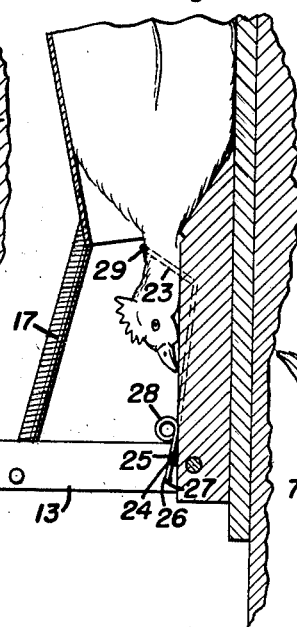
Figure 6 is a fragmentary vertical sectional view showing the head clamping device at the initial cutting movement of the cutter.
Figure 4:
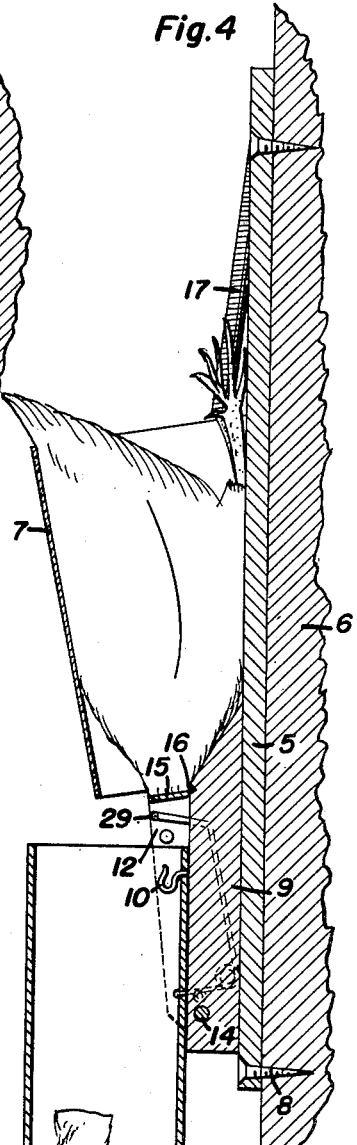
Figure 4 is a vertical sectional view on an enlarged scale taken on a line 4—4 of Figure 1 showing a fowl that has just been decapitated.
Figure 7:
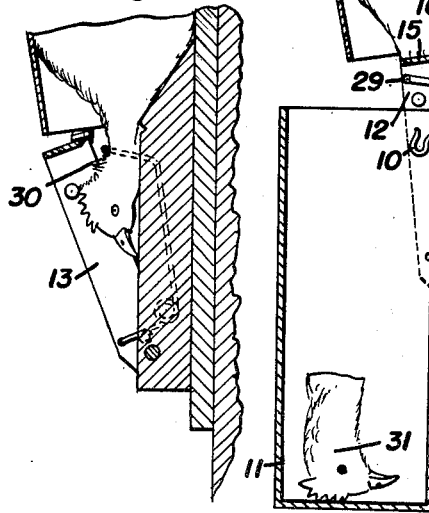
Figure 7 is a similar view showing the feathers scraped from the path of the cutter by the head clamping device as the cutter approaches its cutting position.

The cutter is then released by handle 20 and the initial upward swinging movement of the cutter by springs 17 will also swing the head clamping device 23 against the neck of the chicken to clamp the head against the chopping block 9, as shown in Figure 6.

As the cutter continues its upward movement pressure is increased on the head clamping device and the checking of the clamping movement thereof against the neck of the chicken places increased tension on the coil 28 and results in a downward pulling movement of clamping bar 29 to scrape the feathers 30 on the neck of the chicken downwardly away from the path of the cutting edge 16 of the cutter and bare the neck to prevent interference of the feathers with the cutter.

The severed head 31 then falls in the receptacle 11.

In view of the foregoing description taken in conjunction with the accompanying drawings it is believed that a clear understanding of the construction, operation and advantages of the device will be quite apparent to those skilled in this art. A more detailed description is accordingly deemed necessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fowl decapitator comprising a holder for a fowl placed in the holder with its head exposed, a U-shaped cutter pivoted to a supporting structure adjacent the holder, and spring means connected to the cutter and holding the latter inactive in one direction and also swinging the cutter in an opposite direction to sever the head of the fowl when the cutter is moved past the center of its pivot.

2. A fowl decapitator comprising an attaching base, a tapered hollow holder open at each end attached to the base and adapted to receive a fowl in its wider end with its head protruding from the narrow end of the holder, a chopping block at the narrow end of the holder, and a U-shaped cutter pivoted to the base with its bight portion swingable across the narrow end of the holder to sever the head of the fowl.

3. A fowl decapitator comprising an attaching base, a tapered hollow holder open at each end attached to the base and adapted to receive a fowl in its wider end with its head protruding from the narrow end of the holder, a chopping block at the narrow end of the holder, and a spring actuated U-shaped cutter pivoted to the base with its bight portion swingable across the narrow end of the holder to sever the head of the fowl.

4. A fowl decapitator comprising an attaching base, a tapered hollow holder open at each end attached to the base and adapted to receive a fowl in its wider end with its head protruding from the narrow end of the holder, a chopping block at the narrow end of the holder, and a U-shaped cutter pivoted to the base with its bight portion swingable across the narrow end of the holder to sever the head of the fowl, spring means connected to the cutter and holding the latter inactive in one direction and swinging the cutter in an opposite direction to sever the head of the fowl when the cutter is moved past its pivot.

5. A fowl decapitator comprising an attaching base, a tapered hollow holder open at each end attached to the base and adapted to receive a fowl in its wider end with its head protruding from the narrow end of the holder, a chopping block at the narrow end of the holder, and a U-shaped cutter pivoted to the base with its bight portion swingable across the narrow end of the holder to sever the head of the fowl, spring means connected to the cutter and holding the latter inactive in one direction and swinging the cutter in an opposite direction to sever the head of the fowl when the cutter is moved past its pivot and a clamping device carried by the cutter in advance thereof and moveable thereby against the neck of the fowl.

6. A fowl decapitator comprising an elongated attaching base, a tapered hollow holder open at each end attached to the base intermediate the ends of the base and adapted to receive a fowl in its wider end with its head protruding from the narrow end of the holder, a raised chopping block on the base at the narrow end of the holder, a U-shaped cutter pivoted to the chopping block with its bight portion swingable across the narrow end of the holder to sever the head of the fowl, spring means connected at one set of ends to the cutter on opposite sides of the bight, the other set of ends of said spring means being secured to said attaching base remote from said chopping block and holding the cutter inactive in one direction and swinging the cutter in an opposite direction to sever the head of the fowl when the cutter is moved past its pivot.

References Cited in the file of this patent

UNITED STATES PATENTS

| Number | Name | Date |
|---|---|---|
| 433,151 | Schonemann | July 29, 1890 |
| 549,008 | Olson | Oct. 29, 1895 |
| 551,283 | Huddle | Dec. 10, 1895 |
| 1,133,362 | Cassard | Mar. 30, 1915 |

FOREIGN PATENTS

| Number | Country | Date |
|---|---|---|
| 328,194 | Germany | Oct. 21, 1920 |